(12) United States Patent
Ishitobi et al.

(10) Patent No.: US 9,387,887 B2
(45) Date of Patent: Jul. 12, 2016

(54) VEHICLE HOOD PANEL

(75) Inventors: Hideki Ishitobi, Kobe (JP); Masatoshi Yoshida, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 14/008,566

(22) PCT Filed: Apr. 2, 2012

(86) PCT No.: PCT/JP2012/058940
§ 371 (c)(1),
(2), (4) Date: Sep. 30, 2013

(87) PCT Pub. No.: WO2012/133895
PCT Pub. Date: Oct. 4, 2012

(65) Prior Publication Data
US 2014/0015285 A1    Jan. 16, 2014

(30) Foreign Application Priority Data
Mar. 31, 2011   (JP) ................................. 2011-078650

(51) Int. Cl.
*B62D 25/10* (2006.01)
*B60R 21/34* (2011.01)

(52) U.S. Cl.
CPC ................ *B62D 25/10* (2013.01); *B60R 21/34* (2013.01); *B62D 25/105* (2013.01); *B60R 2021/343* (2013.01)

(58) Field of Classification Search
CPC ...... B62D 25/10; B62D 25/105; B60R 21/34; B60R 2021/343
USPC ............. 296/193.11, 187.04; 180/69.2, 26.21
See application file for complete search history.

(56) References Cited

U.S. PATENT DOCUMENTS

| 7,150,496 | B2 | 12/2006 | Fujimoto |
| 2004/0021342 | A1 | 2/2004 | Fujimoto |
| 2005/0082875 | A1 | 4/2005 | Ikeda et al. |
| 2005/0179286 | A1 | 8/2005 | Adachi |

(Continued)

FOREIGN PATENT DOCUMENTS

| CN | 101395057 | 3/2009 |
| CN | 103328311 A | 9/2013 |

(Continued)

OTHER PUBLICATIONS

International Search Report for corresponding International Application No. PCT/JP2012/058940,Jun. 26, 2012.

(Continued)

*Primary Examiner* — Joseph D Pape
*Assistant Examiner* — Dana Ivey
(74) *Attorney, Agent, or Firm* — Studebaker & Brackett PC

(57) ABSTRACT

A vehicle hood panel is formed by bonding an outer panel and an inner panel to each other. Disposed along the outer peripheral edge of the inner panel is an outer peripheral portion to which a cushion member and hinges for attaching the hood panel to a vehicle are to be later fastened. Adhesive bonding surfaces which are to be bonded to the outer panel by mastic are disposed on the region surrounded by the outer peripheral portion, and a plurality of reinforcement beads are formed between the adhesive bonding surfaces. At least some of the adhesive bonding surfaces and/or reinforcement beads are bended so as to extend toward the hinges or the cushion member as seen in a plan view.

11 Claims, 8 Drawing Sheets

(56) References Cited

U.S. PATENT DOCUMENTS

| | | |
|---|---|---|
| 2006/0163915 A1 | 7/2006 | Ikeda et al. |
| 2008/0007094 A1 | 1/2008 | Ishitobi |
| 2008/0272618 A1 | 11/2008 | Ikeda et al. |
| 2009/0195031 A1 | 8/2009 | Ishitobi |
| 2010/0019540 A1* | 1/2010 | Fujimoto ............... 296/193.11 |
| 2013/0241241 A1 | 9/2013 | Sekikawa et al. |

FOREIGN PATENT DOCUMENTS

| | | |
|---|---|---|
| EP | 1357018 | 10/2003 |
| EP | 1518781 A2 | 3/2005 |
| EP | 1564089 A2 | 8/2005 |
| EP | 1564089 A3 | 12/2005 |
| EP | 1518781 A3 | 2/2006 |
| EP | 1876085 | 1/2008 |
| EP | 1980473 | 10/2008 |
| EP | 2639142 A1 | 9/2013 |
| JP | H11-091627 A | 4/1999 |
| JP | 2003-205866 | 7/2003 |
| JP | 2004-217008 | 8/2004 |
| JP | 2005-096512 | 4/2005 |
| JP | 2005-096608 | 4/2005 |
| JP | 2006-044311 | 2/2006 |
| JP | 2006-315555 | 11/2006 |
| JP | 2007-069888 | 3/2007 |
| JP | 2007-245853 | 9/2007 |
| JP | 2008-024185 | 2/2008 |
| JP | 2008-030574 | 2/2008 |
| JP | 2010-116074 | 5/2010 |
| KR | 10-2008-0005115 | 1/2008 |
| KR | 10-2008-0077685 | 8/2008 |
| WO | WO 02/47961 | 6/2002 |
| WO | WO 2007/105735 | 9/2007 |

OTHER PUBLICATIONS

Written Opinion for corresponding International Application No. PCT/JP2012/058940, Jun. 26, 2012.

The extended European search report issued by the European Patent Office on Sep. 18, 2014, which corresponds to European Patent Application No. 12764347.6-1755 and is related to U.S. Appl. No. 14/008,566.

* cited by examiner (a)

(b)

(c)

(a)

(b)

(c)

VEHICLE HOOD PANEL

TECHNICAL FIELD

The present invention relates to a vehicle hood panel, and in particular, relates to the vehicle hood panel provided with satisfactory basic performances such as panel rigidity, dent resistance, flexural rigidity, and torsional rigidity and the pedestrian protection performance in a collision is improved.

BACKGROUND ART

Nowadays pedestrian protection in vehicle accidents is stipulated by law, and receives attention as an index of ratings. Because of improvement of the performance of an engine or the like due to an increase in size of the engine, the number of components in the engine compartment has been increasing, thereby reducing a space below a hood, which is necessary for pedestrian protection. Thus, in order to realize both the sporty design and pedestrian head protection, development of a hood structure with which collision energy can be effective absorbed with a small sized space is desired.

The head injury criterion HIC in a pedestrian collision is defined as a maximum product of the 2.5th power of average acceleration applied within an arbitrary time period and an occurrence time period. The HIC is given by the following Math. 1.

$$HIC = [1/(t2-t1) \int_{t1}^{t2} a\, dt]^{2.5}(t2-t1) \quad [\text{Math. 1}]$$

where a denotes the three-axis resultant acceleration (unit: G) at the center of gravity of the head, t1 and t2 denote points in time having the relationship of 0<t1<t2 to cause a maximum HIC value. An operation time (t2−t1) is specified to be 15 msec or less.

Usually, acceleration G in a collision in which the head of the pedestrian collides with the vehicle is generally classified into a first acceleration peak and a second acceleration peak. The first acceleration peak is generated by a primary collision in which the head collides with the hood panel. After that, the second acceleration peak is generated by a secondary collision in which the hood panel is brought into contact with components disposed in the engine compartment. When a space below the hood is small, the generated collision acceleration is greater in the secondary collision than in the primary collision. Also, a time period during which collision continues is longer in the secondary collision. Thus, the second acceleration peak affects the HIC value more adversely than the first acceleration peak.

Accordingly, in order to reliably achieve the pedestrian protection performance with a limited space, a hood structure is desired, with which a larger amount of energy is reliably absorbed in the primary collision, a crushing load of the hood panel is decreased so as to reliably increase a deformation stroke, and the size of the second acceleration peak is decreased. That is, by decreasing the deformation load of the hood panel, the amount by which the hood panel is deformed is increased, and accordingly, areas not crushed are decreased, and the deformation stroke can be increased.

The hood panel is also required to satisfy the conventionally demanded basic performances such as panel rigidity, dent resistance, flexural rigidity, and torsional rigidity. Panel rigidity is a physical property required for suppressing elastic deformation of the hood panel in the case where a pushing load is applied to the hood panel in such a time when waxing the hood panel or locking the hood panel. The panel rigidity is determined by the Young's modulus of an outer panel and positions where the outer panel and an inner panel are bonded to each other. Dent resistance is a physical property required for suppressing plastic deformation remaining in the hood panel when pebbles or the like fly and hit the hood panel. Dent resistance is determined by proof stress and the thickness of the outer panel. Flexural rigidity is a physical property required for suppressing elastic deformation of an outer peripheral portion of the hood panel occurring due to a pulling force in the vehicle direction produced when the hood is locked and reactive forces produced by cushion rubber, damper stays, sealing rubber, and the like. Flexural rigidity is determined by the Young's modulus (modulus of longitudinal elasticity) and a second moment of area calculated from the shapes of the inner panel and a reinforcement in the outer peripheral portion of the hood panel. Torsional rigidity is determined by the flexural rigidity of the hood panel in the outer peripheral portion and the thickness and the shape of the inner panel in a central portion of a hood.

Patent Literature 1 proposes a technology in which, with a plurality of reinforcement beads provided so as to be parallel to one another in an inner panel, flexural rigidity of the inner panel is improved, bending of the inner panel occurring when the head of the pedestrian collides with a panel is suppressed, and an impact load is widely distributed over the panel. That is, with the reinforcement beads provided in the inner panel, when the head of the pedestrian collides with the panel, the area by which the panel is displaced is increased, thereby increasing the amount of the impact load to be absorbed. Thus, in comparison with the case where the reinforcement beads are not provided, the size of the first acceleration peak can be increased when the head collides with the panel. The reinforcement beads, which are each formed to have a hat shape, are easily flattened when the reinforcement beads are brought into contact with contained components. This can also decrease the size of the second acceleration peak. In Patent Literature 2, the inventors of the present application also proposed a hood panel in which a plurality of reinforcement beads are provided so as to be parallel to one another from the above-described viewpoint.

Patent Literatures 3 to 6 disclose inner panels in which hat-shaped reinforcement heads are formed so as to extend in the vehicle front-rear direction. In these inner panels, the upright walls of the reinforcement beads have a step shape (Patent Literature 3), the depth of the bottom surfaces of the reinforcement beads is varied (Patent Literature 4), or cuts are formed between the reinforcement beads (Patent Literature 5). Furthermore, a technology is disclosed in which the shape of the hat-shaped reinforcement beads provided in the inner panel is varied in the vehicle front-rear direction in view of the fact that, when the pedestrian who collides with the vehicle is a child, the pedestrian tends to collide with a front side of the hood panel, and when the pedestrian who collides with the vehicle is an adult, the pedestrian tends to collide with a rear side of the hood panel (Patent Literature 6).

CITATION LIST

Patent Literature

PTL 1: Japanese Unexamined Patent Application. Publication No. 2003-205866

PTL 2: Japanese Unexamined Patent Application Publication No. 2008-30574

PTL 3: Japanese Unexamined Patent Application Publication No. 2005-96512

PTL 4: Japanese Unexamined Patent Application Publication No. 2008-24185

PTL 5: Japanese Unexamined Patent Application Publication No. 2004-217008

PTL 6: Japanese Unexamined Patent Application. Publication No. 2005-96608

SUMMARY OF INVENTION

Technical Problem

However, there are problems with the above-described related art as follows. That is, there is a demand for a hood panel, which is reliably provided with basic performances such as panel rigidity, dent resistance, flexural rigidity, and torsional rigidity, and with which a good pedestrian protection performance is achieved. However, as described above, the size of the space below the hood is restricted by a large sized engine and the like. Thus, with a hood panel, the material, the plate thickness, and the shape of which are designed so as to satisfy only the basic performances, the pedestrian protection performance cannot be reliably achieved in many cases. In particular, since the outer peripheral portion of the hood panel needs to have a large flexural rigidity, a second moment of area and the panel rigidity need to be increased in the inner panel and the reinforcement. Thus, these portions are not easily crushed. This causes a problem in that it is difficult for the size of the second acceleration peak in the secondary collision to be decreased.

In order to solve the above-described problems by changing the structure of the hood panel, it is necessary that a large amount of energy be reliably absorbed in the primary collision so as to decrease an impact load in the secondary collision. In order to achieve these, the plate thickness may be increased. However, when the thickness of the outer panel is increased, there occur problems in that, for example, cracks in a hemming process cannot be prevented or R in the panel shape becomes larger, thereby degrading the appearance. When the thickness of the inner panel is increased, there may be a problem in that a load applied in crushing is increased and the size of the second acceleration peak in the secondary collision, in which the hood panel collides with the contents below the hood, is increased, thereby increasing the HIC value (degrading the pedestrian protection performance). In particular, since the outer peripheral portion of the hood panel needs to have a high flexural rigidity, even when the plate thickness is increased, the sectional height cannot be decreased and the HIC value is increased.

Furthermore, in order to improve the pedestrian protection performance, it is necessary that the crushing load of the hood panel be decreased so as to reliably increase a stroke, thereby decreasing the size of the second acceleration peak in the secondary collision. In order to achieve this, as described in the above-mentioned Patent Literatures 1 to 6, for example, the outer peripheral portion of the inner panel may have a shape that is easily crushed, or, for example, a slightly inclined surface may be formed in the outer peripheral portion of the inner panel. However, in order to reliably provide the hood panel with a specified flexural rigidity, the size of the section cannot be reduced, and accordingly, the distance between portions of the outer panel and the inner panel where the outer panel and the inner panel are bonded to each other is increased. This causes a problem in that panel rigidity is degraded.

The present invention is proposed in view of the above-described problems. An object of the present invention is to provide a vehicle hood panel reliably provided with panel rigidity, dent resistance, flexural rigidity, and torsional rigidity, which are required for a vehicle hood panel. With the vehicle hood panel, the pedestrian protection performance is improved.

Solution to Problem

A vehicle hood panel according to the present invention includes an outer panel and an inner panel joined to each other. In the vehicle hood panel, the inner panel includes an outer peripheral portion provided along an outer peripheral edge of the inner panel. A hinge and a cushion member, which are used to attach a hood panel to a vehicle, are to be secured to the outer peripheral portion. The inner panel also includes first adhesive bonding surfaces that are formed in a region surrounded by the outer peripheral portion and are joined by mastic to the outer panel. The inner panel also includes a plurality of reinforcement beads that each have a recessed shape in sectional view and are formed between the first adhesive bonding surfaces. In the vehicle hood panel, at least some of either or both of the first adhesive bonding surfaces and the reinforcement beads are curved so as to extend toward the hinge or the cushion member in plan view.

In the vehicle hood panel according to the present invention, the first adhesive bonding surfaces are provided, for example, at a plurality of positions so as to be arranged in a vehicle left-right direction. Alternatively; the first adhesive bonding surfaces are provided at a plurality of positions so as to be arranged in a vehicle front-rear direction. In this case, either or both of the curved first adhesive bonding surfaces and the curved reinforcement beads are provided, for example, further toward a vehicle front side or further toward a vehicle rear side than a center in the vehicle front-rear direction in the vehicle hood panel. The inner panel further includes, for example, a second adhesive bonding surface that is provided so as to surround the first adhesive bonding surfaces and connects the first adhesive bonding surfaces to one another. Alternatively, the inner panel further includes, for example, intermediate reinforcement beads. Each of the reinforcement beads is provided with the intermediate reinforcement bead that rises from a bottom surface of the reinforcement bead at an end portion of the reinforcement bead so as to connect both side surfaces of the reinforcement bead. The height of the intermediate reinforcement bead from the bottom surface of the reinforcement bead is lower than the first adhesive bonding surfaces.

The inner panel further includes, for example, an outer peripheral step that is provided along an inner edge of the outer peripheral portion, which surrounds the plurality of reinforcement beads, and that extends upward from the outer peripheral portion so as to have a step shape.

The inner panel is formed of, for example, an aluminum plate or an aluminum alloy plate having a thickness of 0.5 to 1.5 mm, or a steel plate having a thickness of 0.4 to 1.0 mm. The bottom surfaces of the reinforcement beads are provided, for example, at positions 5 to 30 mm deep from the first adhesive bonding surfaces or the second adhesive bonding surface.

Advantageous Effects of Invention

In the vehicle hood panel according to the present invention, the inner panel includes the outer peripheral portion to which the hinge and the cushion member are to be secured, the first adhesive bonding surfaces that are formed in the region surrounded by the outer peripheral portion and are joined by mastic to the outer panel, and the plurality of reinforcement beads that each have a recessed shape in sectional view and are formed between the first adhesive bonding surfaces. At least some of either or both of the first adhesive bonding surfaces and the reinforcement beads are curved so as to extend toward the hinge or the cushion member in plan view. By curving at least some of either or both of the first adhesive bonding surfaces and the reinforcement beads as described above, a situation in which the reinforcement beads are flattened can be suppressed due to rigidity of the inner panel in a primary collision in which the head of a pedestrian collides with the hood panel. Thus, the peak value of the first acceleration peak can be increased.

Furthermore, either or both of the first adhesive bonding surfaces and the reinforcement beads extend toward the hinge or cushion member, that is, extend toward positions where deformation, vibration, and the like of the panel due to an impact load are small. Thus, large deformation acceleration following the first acceleration peak in the primary collision can be maintained, and accordingly, the amount of energy absorbed by the panel can be increased in the primary collision. Thus, a load in the secondary collision can be decreased and the pedestrian protection performance can be improved.

REFERENCE SIGNS LIST

Figure 1:
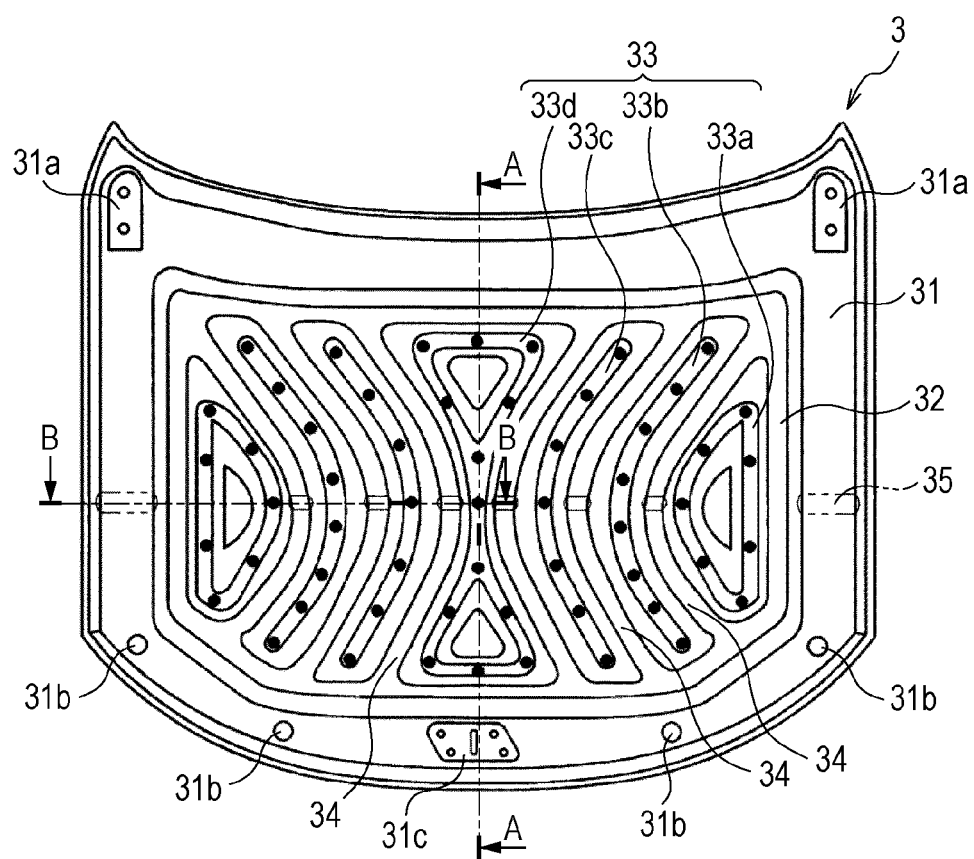
FIG. 1 is a plan view of a vehicle hood panel according to a first embodiment of the present invention.

1: (vehicle) hood panel
2: outer panel
3: inner panel
31: outer peripheral portion
31a: hinge seating surface
31b: cushion member seating surface
31c: hood lock seating surface
32: outer peripheral step
33: adhesive bonding surface
34: reinforcement bead
35: crush bead
36: intermediate reinforcement bead
4: mastic adhesive

DESCRIPTION OF EMBODIMENTS

The inventors have intensely conducted experiments and study on a vehicle hood panel in order to improve the pedestrian protection performance while reliably providing the vehicle hood panel with characteristics required for the vehicle hood panel such as panel rigidity, dent resistance, flexural rigidity, and torsional rigidity. The inventors have found that, by curving at least some of either or both of adhesive bonding surfaces and reinforcement beads of an inner panel, a situation in which reinforcement beads are flattened can be suppressed due to rigidity of the inner panel in a primary collision in which the head of a pedestrian collides with the hood panel, thereby permitting the energy absorption amount to be increased.

The inventors have also found that, by providing either or both of the adhesive bonding surfaces and the reinforcement beads, which are curved, so as to extend toward hinges or a cushion member, deformation, vibration, and the like due to an impact load can be reduced particularly at the tip end portions of either or both of the adhesive bonding surfaces and the reinforcement beads. By doing this, the size of a first acceleration peak can be increased, and accordingly, a large amount of energy can be reliably absorbed in the primary collision and load in the secondary collision can be reduced. This can improve the pedestrian protection performance.

Figure 2:
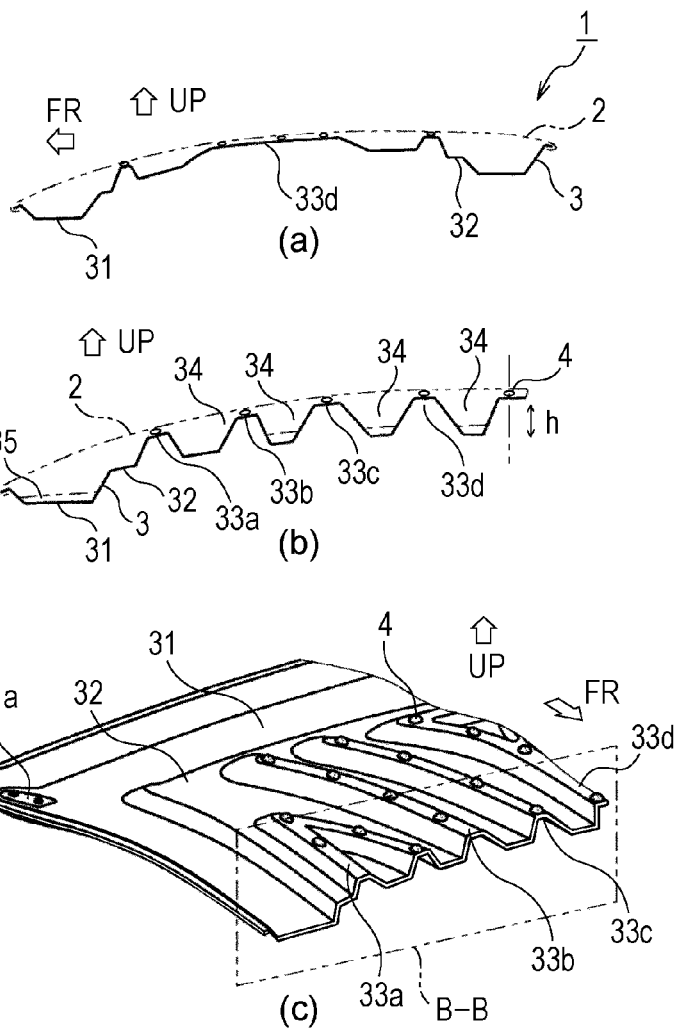
FIG. 2 View (a) is a sectional view taken along line A-A in FIG. 1, view (b) is a sectional view taken along line B-B in FIG. 1, and view (c) is a perspective view of part of an inner panel illustrated in FIG. 1.

Embodiments according to the present invention will be described in detail below. The structure of a vehicle hood panel according to a first embodiment of the present invention is initially described. FIG. 1 is a plan view of a vehicle hood panel according to the first embodiment of the present invention. View (a) of FIG. 2 is a sectional view taken along line A-A in FIG. 1, view (b) of FIG. 2 is a sectional view taken along line B-B in FIG. 1, and view (c) of FIG. 2 is a perspective view of part of an inner panel illustrated in FIG. 1. As illustrated in FIGS. 1 and 2, a vehicle hood panel 1 according to the present embodiment includes an inner panel 3 and an outer panel 2. An outer edge portion of the inner panel 3 is joined to an outer edge portion of the outer panel 2 by, for example, a hemming process.

The inner panel 3 and the outer panel 2 are each formed of, for example, a metal plate such as a steel plate, an aluminum plate, and an aluminum alloy plate. In the case where the inner panel 3 is formed of an aluminum plate or an aluminum alloy plate, the thickness thereof is, for example, from 0.5 to 1.5 mm. In the case where the inner panel 3 is formed of a steel plate, the thickness thereof is, for example, from 0.4 to 1.0 mm. In the case where the thickness of the inner panel 3 is less than the above-described lower limits, press molding properties tend to degrade. In the case where the thickness of the inner panel 3 exceeds the above-described upper limits, the HIC value in the primary collision tends to exceed 1000. In the case where the inner panel 3 is formed of a metal plate other than a steel, aluminum, and aluminum alloy plate, the above-described upper limit of the thickness is inversely proportional to the specific gravity of the raw material.

The outer panel 2 is formed of a desirable metal plate adequately selected in accordance with properties for panel formation and the shape of the panel to be formed. In the case where the outer panel 2 is formed of an aluminum plate or an aluminum alloy plate and the thickness is less than 0.5 mm, it is difficult to sufficiently obtain performances such as panel rigidity and dent resistance of the panel. When the thickness of the outer panel 2 exceeds 1.5 mm, an increase in mass of the hood panel is increased and cracks are easily produced during the hemming process. Thus, it is preferable that the thickness be from 0.5 to 1.5 mm. In the case where the outer panel 2 is formed of a steel plate, it is preferable that the thickness be from 0.4 to 1.0 mm. In the case where the outer panel 2 is formed of another metal plate, it is preferable that the thickness be inversely proportional to the specific gravity.

The inner panel 3 has an outer peripheral portion 31 along the outer peripheral edge to be joined to the outer panel 2 through a hemming process. Hinges and a cushion member for attachment of the hood panel to the vehicle are to be secured to the outer peripheral portion 31. Adhesive bonding surfaces 33 are formed in a region surrounded by the outer peripheral portion 31. The adhesive bonding surfaces 33 are joined by mastic to the outer panel 2. Reinforcement beads 34 having a recess shape in sectional view are formed between the adhesive bonding surfaces 33. In the present embodiment, the inner panel 3 includes an outer peripheral step 32 formed along an inner edge of the outer peripheral portion 31 that surrounds the reinforcement beads 34. The outer peripheral step 32 has a step shape that rises upward from the outer peripheral portion 31.

In the present embodiment, the adhesive bonding surfaces 33 are provided at a plurality of positions so as to be arranged in the vehicle left-right direction. The reinforcement beads 34 formed between the adhesive bonding surfaces 33 are also arranged in the vehicle left-right direction. As illustrated in views (a) and (b) of FIG. 2, a mastic adhesive 4, which is made of, for example, an epoxy resin, a modified silicone resin, or the like, is applied between the adhesive bonding surfaces 33 and the outer panel 2, thereby bonding the adhesive bonding surfaces 33 and the outer panel 2 to each other.

The hood panel 1 according to the present embodiment is provided with, for example, hinge seating surfaces 31a and cushion member seating surfaces 31b in the outer peripheral portion 31. Hinges for connecting the hood panel 1 to a vehicle main body are secured to the hinge seating surfaces 31a, and a cushion member such as cushion rubber that prevents the hood panel 1 from interfering with the vehicle main body and prevents the hood panel 1 from vibrating are secured to the cushion member seating surfaces 31b. The hood panel 1 is also provided in the outer peripheral portion 31 with a hood lock seating surface 31c to which a hood lock member that holds the hood panel in a closed state is secured.

As illustrated in FIGS. 1 and 2, in the present embodiment, the adhesive bonding surfaces 33 include first adhesive bonding surfaces, which are provided at plurality of positions (portions 33a to 33d) so as to be arranged in the vehicle left-right direction. The first adhesive bonding surfaces are to be joined by mastic to the outer panel 2. That is, the first adhesive bonding surfaces includes the portions 33a to 33d as follows; the portions 33a that each have a substantially annular shape and provided near each end of a step portion 32 in the vehicle left-right direction; the portions 33b that are provided closer to the center in the vehicle left-right direction than the annular portions 33a and are each curved to have a substantially dog-leg shape in plan view such that an end portion of the each portion 33b on the vehicle rear side extends toward a corresponding one of the hinge seating surfaces 31a; the portions 33c that are provided closer to the center in the vehicle left-right direction than the portions 33b and are each curved to have a substantially dog-leg shape in plan view such that an end portion of each portion 33c on the vehicle front side extends toward a corresponding one of the cushion member seating surfaces 31b; and the portion 33d that have substantially annular parts, which are respectively provided on the vehicle front and rear sides near the center in the vehicle left-right direction and connected to each other in the vehicle front-rear direction. The hood lock seating surface 31c is positioned on the vehicle front side of the portion 33d. That is, in the present embodiment, the plurality of reinforcement beads 34 each extend in the vehicle front-rear direction and are curved near the center of the hood panel 1 in the vehicle front-rear direction.

In the curved reinforcement beads 34, the radius of curvature of an edge portion of an inner side (side opposite to a protruding side) at the bottom surface is, for example, 50 to 10000 mm. For example, in the reinforcement head 34 provided between each portion 33a and a corresponding one of the portions 33b of the first adhesive bonding surfaces, the radius of curvature of the edge portion on the portion 33a side at the bottom surface is 500 mm. In the case where the radius of curvature of the edge portion on the inner side at the bottom surface of the reinforcement beads 34 is less than 50 mm, the hood panel is not easily crushed in the secondary collision, in which the hood panel collides with contents inside an engine compartment. When the radius of curvature of the edge portion on the inner side at the bottom surface of the reinforcement beads 34 exceeds 10000 mm, the shape of each reinforcement bead 34 is closed to a linear shape in plan view and the advantageous effects of the present invention are unlikely to be obtained.

In order to realize a hood panel, the pedestrian protection performance of which is improved only with a limited space in a lower part of the hood, as mentioned above, it is important to reliably absorb a large amount of collision energy in the primary collision. A first acceleration peak in the primary collision is mainly an inertia force, which is produced by the difference in relative speeds between the head of the pedestrian and the hood. In the present embodiment, as indicated by a bead depth h in view (b) of FIG. 2, it is preferable that the bottom surface of the reinforcement beads 34 be provided at a position 5 to 30 mm deep from the adhesive bonding surfaces 33. That is, in the case where the bead depth h is excessively shallow, the rigidity improving effect for the inner panel 3 produced by the recess-shaped reinforcement beads 34 is decreased. As a result, when colliding with a pedestrian, only the reinforcement beads near the collision position are deformed, and accordingly, the peak value of the first acceleration peak is decreased. Thus, it is difficult to transmit stress generated in the collision over the entire reinforcement beads 34 by the inertia force of the first acceleration peak. Thus, the amount by which collision energy is absorbed is insufficient at an initial stage of the collision, the peak value of the second acceleration peak is increased, thereby increasing the HIC value (pedestrian protection performance is degraded). When the bead depth h is excessively deep, a time period taken for the contents in the hood to be subjected to the collision is increased, and accordingly, the secondary collision occurs without collision energy at the initial stage of the collision being sufficiently absorbed. Also in this case, the peak value of the second acceleration peak is increased, thereby increasing the HIC value (pedestrian protection performance is degraded).

Next, operation of a vehicle hood panel according to the present embodiment is described. When the pedestrian collides with the hood panel 1, shocks caused by the collision are initially transmitted to the outer panel 2, and part of the outer panel 2 near the collision position is deformed. This deformation stress is transmitted to the inner panel 3 near the collision position through the adhesive bonding surfaces 33. In the case where each of the reinforcement beads 34 has a linear shape so as to extend in a single direction, upright walls in a bead side portions are formed of flat surfaces. In this case, deformation stress applied from above only causes the upright walls to incline. Thus, the reinforcement beads 34 are easily flattened. In the present embodiment, the reinforcement beads 34 arranged in the vehicle left-right direction each extend generally in the vehicle front-rear direction and are curved near the center of the inner panel 3 in the vehicle front-rear direction. The upright walls in the bead side portions are formed of curved surfaces instead of flat surfaces. Also, the curved upright, walls have components that extend in the vehicle left-right direction, thereby functioning as reinforcing ribs. Thus, when deformation stress is applied from above, inclination of side walls is not easily changed. Accordingly, the inner panel 3 has a high rigidity, and a situation in which the reinforcement beads 34 are flattened is suppressed. Deformation stress applied to the reinforcement beads 34 can be transmitted in a direction in which the reinforcement beads 34 extend, for example, through the side walls and bottom surfaces of the reinforcement beads 34. In the present embodiment, since the reinforcement beads 34 are curved, deformation stress applied due to a collision can be transmitted also in the vehicle left-right direction through the side walls of the reinforcement beads 34.

Figure 3:
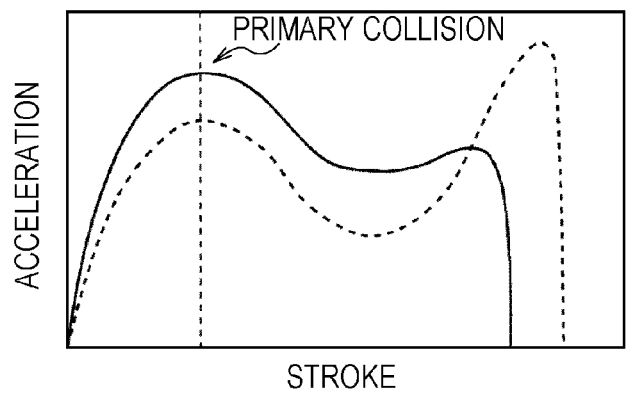
FIG. 3 illustrates the relationship between deformation acceleration and a stroke with the vehicle hood panel according to the present invention when the pedestrian collides with a vehicle.
Figure 4:
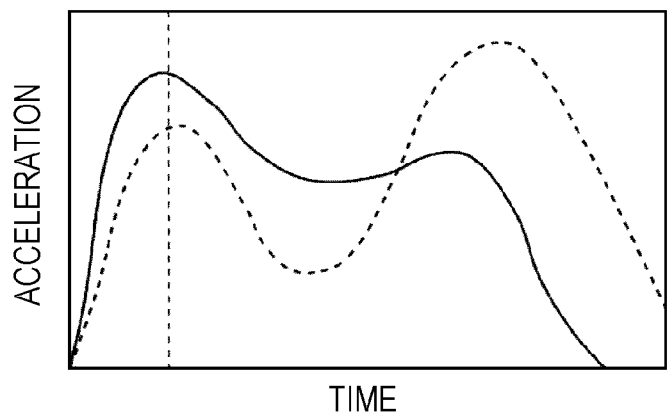
FIG. 4 illustrates the relationship between deformation acceleration and time with the vehicle hood panel according to the present invention when the pedestrian collides with a vehicle.

FIG. 3 illustrates the relationship between deformation acceleration and a stroke with the vehicle hood panel according to the present first embodiment when the pedestrian collides with the vehicle, and FIG. 4 illustrates the relationship between deformation acceleration and time when the pedestrian collides with the vehicle. In FIGS. 3 and 4, waveforms observed with a related-art hood panel are indicated by broken lines. Since the inner panel 3 of the hood panel 1 according to the present embodiment has a very high rigidity against deformation stress from above, as indicated by solid lines in FIGS. 3 and 4, the peak value of the first acceleration peak generated when the pedestrian collides with the vehicle can be increased. When the pedestrian collides with the vehicle, it is ideal that the peak value of collision acceleration be decreased in both the primary and secondary collisions. That is, in the correlation charts illustrated in FIGS. 3 and 4, by making the relationship between a deformation stroke and collision acceleration and the relationship between time and collision acceleration appear more like a rectangular wave, the peak value of the first acceleration peak is decreased, and damage to the head of the pedestrian occurring due to an increase in momentary collision acceleration can be prevented, and a sudden decrease in deformation acceleration or a deformation load following the first acceleration peak can be prevented. Thus, collision energy can be stably absorbed by a small stroke.

When deformation of the hood panel 1 is advanced due to the primary collision, deformation acceleration of the inner panel 3, which is peaked at the time of the collision, is significantly decreased, and the amount of energy absorbed by the panel is also decreased. As indicated by the broken line in FIG. 3, in the related-art hood panel, the peak value of the first acceleration peak is small and a decrease in deformation acceleration following the primary collision is significantly large. Thus, the stroke until the secondary collision occurs is increased and the peak value of the second acceleration peak in the secondary collision is significantly increased. Also, as illustrated in FIG. 4, a time period taken before the secondary collision finishes is increased. This causes a problem in that the HIC value is increased.

In the present embodiment, the adhesive bonding surfaces 33 include first adhesive bonding surfaces, which are provided at plurality of positions (portions 33a to 33d) so as to be arranged in the vehicle left-right direction. The first adhesive bonding surfaces are joined by mastic to the outer panel 2. At least some of either or both of the adhesive bonding surfaces and the reinforcement beads are formed so as to extend toward the hinges or the cushion member in plan view. That is, in the adhesive bonding surfaces 33, the end portion of each portion 33b on the vehicle rear side extends toward a corresponding one of the hinge seating surfaces 31a, and the end portion of each portion 33c on the vehicle front side extends toward a corresponding one of the cushion member seating surfaces 31b. The reinforcement beads 34, which are formed between the portions 33a and the portions 33b of the adhesive bonding surfaces 33, also extend toward the hinge seating surfaces 31a on the vehicle rear side. These hinge seating surfaces 31a and the cushion member seating surfaces 31b are parts to which the hinges or the cushion rubber are to be secured when the hood panel 1 is attached to the vehicle and are parts that are very stable, being subjected to small vibration or the like while the vehicle is running. Also in these parts, deformation, vibration, and the like of the panel due to an impact load are very small when the pedestrian collides with the vehicle. Thus, as indicated by the solid line in FIG. 3, large deformation acceleration following the first acceleration peak in the primary collision can be maintained, and accordingly, the amount of energy absorbed by the hood panel can be increased. Thus, the stroke before the secondary collision occurs is decreased, and the peak value of the second acceleration peak in the secondary collision can also be decreased. Furthermore, since collision energy can be sufficiently absorbed in the primary collision, as indicated by the solid line in FIG. 4, the time period taken before the secondary collision finishes is decreased, and accordingly, the HIC value can be decreased. Thus, the pedestrian protection performance of the hood panel according to the present embodiment is significantly high.

In the present embodiment, when at least some of either or both of the adhesive bonding surfaces 33 and the reinforcement beads 34 are formed so as to extend toward the hinges or the cushion member in plan view, the above-described effects can be obtained. However, in order to further improve the pedestrian protection performance, for example, the shape of the inner panel 3 can be changed as follows. That is, the thickness of the inner panel 3 is decreased on the vehicle front side and increased on the vehicle rear side, thereby decreasing the deformation load (facilitating deformation) of the panel on the vehicle front side and reliably absorbing a large amount of energy in a collision on the vehicle rear side. Thus, a collision region of the hood panel 1 is divided, and a form of collision energy absorption can be optimized for the case where the pedestrian colliding with the vehicle is a child and for the case where the pedestrian colliding with the vehicle is an adult.

In the present embodiment, the hood lock seating surface 31c is provided only at one position at the center in the vehicle left-right direction at a front end portion of the hood panel. However, the hood locks may be provided at two positions in the front end portions of the hood panel 3 depending on the type of vehicle. In this case, the hood lock seating surfaces 31c are provided instead of two cushion member seating surfaces 31b on the vehicle front side illustrated in FIG. 1. Even in this case, the end portions of either or both of the reinforcement beads 34 and the first adhesive bonding surfaces 33 on the vehicle rear side extend toward the hinge seating surfaces 31a. Thus, the above-described advantageous effects of the present invention can be obtained.

Furthermore, in the case where the collision region of the hood panel 1 is divided in accordance with the type of pedestrian who collides with the vehicle, the shape of the reinforcement beads 34 may be changed. For example, the width of the reinforcement beads 34 may be decreased on the vehicle front side and increased on the vehicle rear side. Alternatively, the depth of the reinforcement beads 34 may be decreased on the vehicle front side and increased on the vehicle rear side. Alternatively, in each of the reinforcement beads 34, R provided at boundaries between the upright walls and the bottom surface and boundaries between the upright walls and the adhesive bonding surfaces 33 may be increased on the vehicle front side so that the reinforcement bead 34 can be more easily deformed in the secondary collision and decreased on the vehicle rear side so as to increase the rigidity, thereby the amount of energy absorbed in the secondary collision can be increased. Furthermore, in each of the reinforcement beads 34, angles at which the upright walls are inclined relative to the bottom surface may be decreased on the vehicle front side and increased on the vehicle rear side. Furthermore, by decreasing the distance between the adhesive bonding surfaces 31, which is provided in a plurality of regions, on the vehicle front side, the panel rigidity and dent resistance of the hood panel are improved on the vehicle front side where the panel rigidity and dent resistance are required.

Also in the hood panel 1 according to the present embodiment, for example, small reinforcement beads or irregularities may be provided near the boundaries between the upright walls and the adhesive bonding surface 33 in the upright walls of the reinforcement beads 34. This suppresses a local deformation of the panel caused when the head of the pedestrian collides with the vehicle.

Furthermore, the reinforcement beads 34 may have a step-shaped side walls. Thus, when the hood panel 1 collides with the contents inside the hood, step portions serve as initial irregularities and facilitate crushing of reinforcement beads 34. Furthermore, cuts or slits may be formed in the reinforcement beads 34 so as to decrease the deformation load in the secondary collision and increase the effective stroke.

Also, in order to facilitate bending of the hood panel not only when the pedestrian collides with the vehicle but also when, for example, the vehicle collides with a vehicle in a frontal collision, crush beads 35 may be provided in the inner panel 3 as indicated by two-dot chain line in FIG. 1. With the crush beads 35 provided so as to extend in the vehicle left-right direction, the hood panel 1 is easily bent from the crush heads 35 into a substantially dog-leg shape in side view when the vehicle collides with the other vehicle in a frontal collision, and accordingly, entrance of the panel and the like into the vehicle can be prevented. Instead of providing the crush beads 35, holes may be formed so as to induce bending when the vehicle collides with the other vehicle in a frontal collision.

The shape of the hood panel 1 may be changed in accordance with a design property and functions of the vehicle. For example, the width or height of the reinforcement beads 34 may be changed in accordance with a step height determined in consideration of the outer shape or the design property of the outer panel 2. The reinforcement beads 34 may branch. Alternatively, the inner panel 3 may have holes in order to decrease the weight of the hood panel 1 or release liquid during electrode position, or holes used for attachment of components such as a hood silencer, a washer hose, and cushion rubber.

Figure 5:
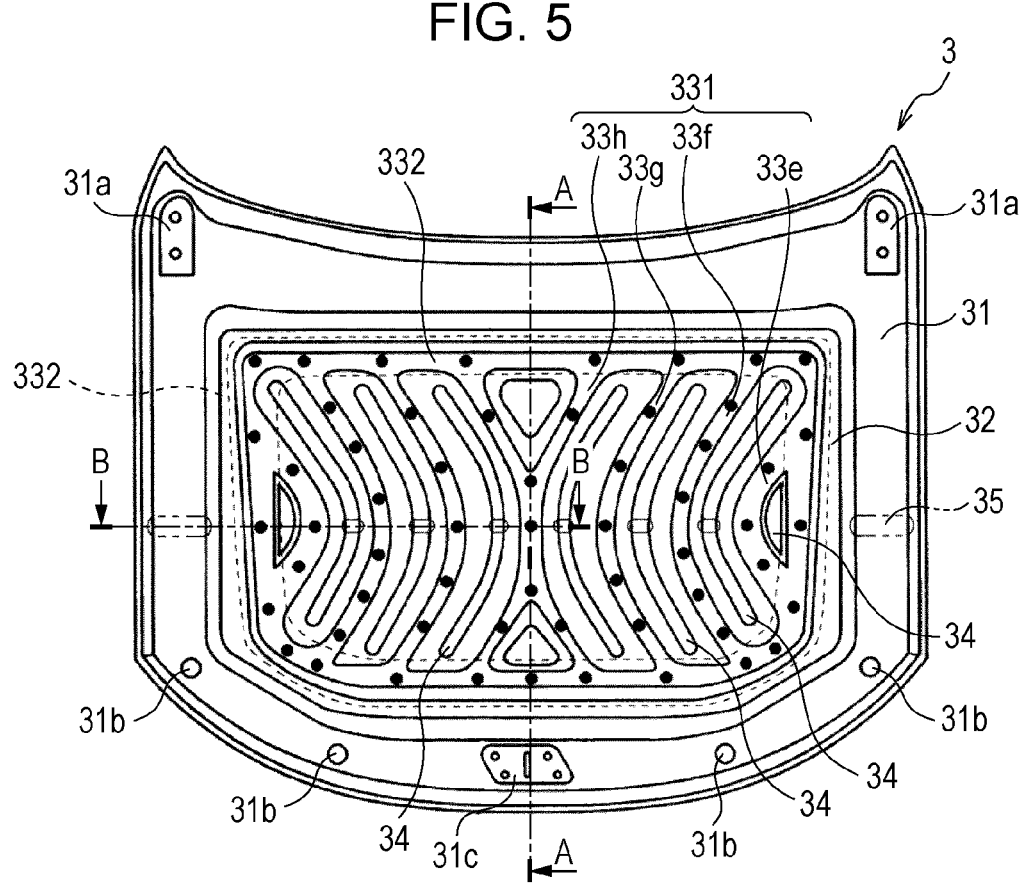
FIG. 5 is a plan view of a vehicle hood panel according to a second embodiment of the present invention.
Figure 6:
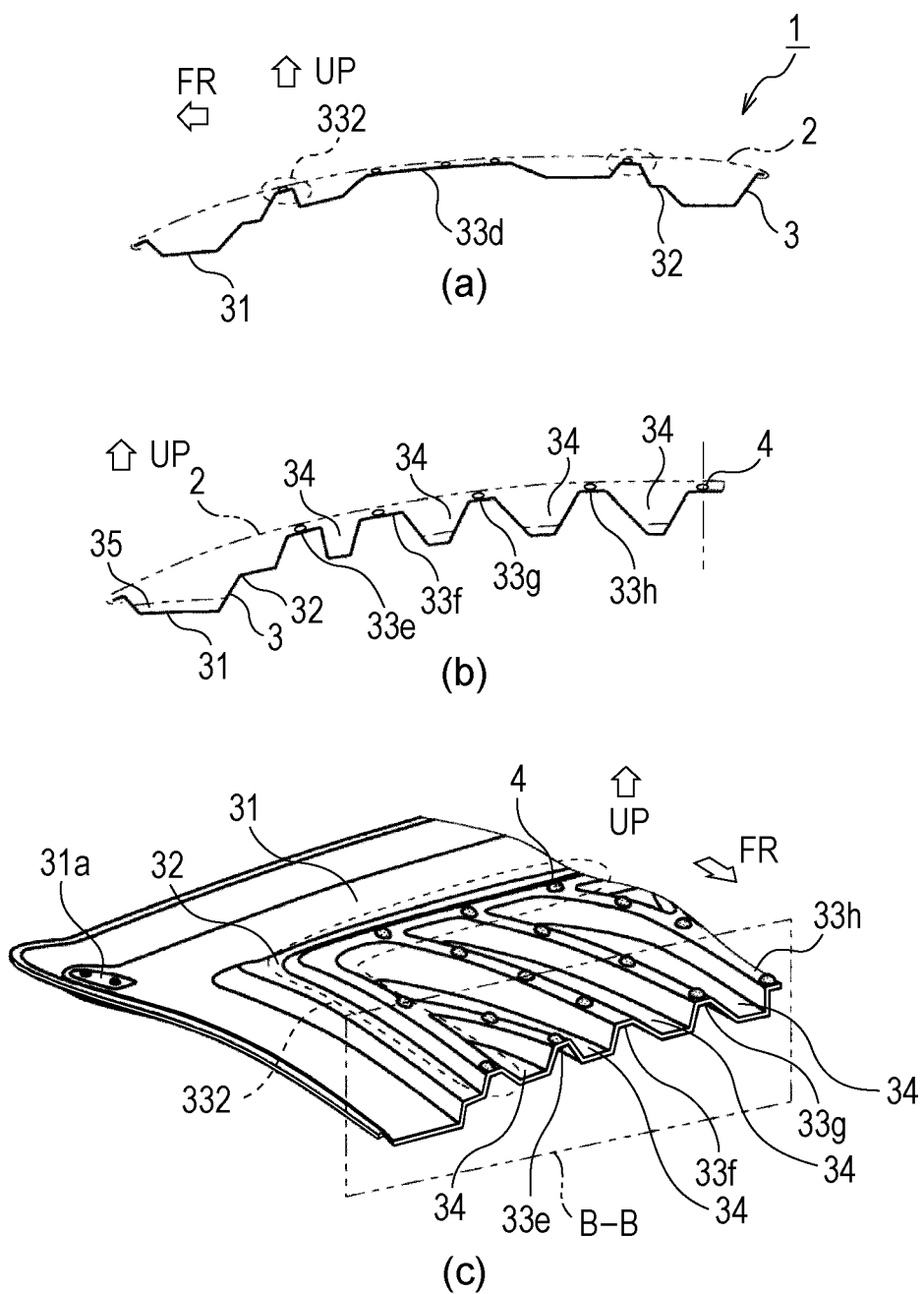
FIG. 6 View (a) is a sectional view taken along line A-A in FIG. 5, view (b) is a sectional view taken along line B-B in FIG. 5, and view (c) is a perspective view of part of an inner panel illustrated in FIG. 5.

Next, the vehicle hood panel according to a second embodiment of the present invention is described. FIG. 5 is a plan view of the vehicle hood panel according to the second embodiment of the present invention, view (a) of FIG. 6 is a sectional view taken along line A-A in FIG. 5, view (b) of FIG. 6 is a sectional view taken along line B-B in FIG. 5, and view (c) of FIG. 6 is a perspective view of part of the inner panel illustrated in FIG. 5. As illustrated in FIGS. 5 and 6, in the present embodiment, the adhesive bonding surfaces 33 include a first adhesive bonding surfaces 331, which have portions 33e to 33h provided at plurality of positions so as to be arranged in the vehicle left-right direction in plan view. End portions of the first adhesive bonding surfaces are connected to one another by a second adhesive bonding surface 332, which surrounds the first adhesive bonding surfaces 331. Other structures are similar to those of the first embodiment.

In the present embodiment, the end portions of the first adhesive bonding surfaces 331 are connected to one another through the second adhesive bonding surface 332. Thus, as illustrated in FIGS. 5 and 6 (c), side walls of the second adhesive bonding surface 332 are formed at the end portions of the reinforcement beads 34 formed between the portions 33e to 33h of the first adhesive bonding surfaces 331. Accordingly, deformation stress transmitted along the reinforcement beads 34 in the primary collision is transmitted to the second adhesive bonding surface 332 through the side walls of the second adhesive bonding surface 332, and then transmitted in the vehicle left-right direction along the second adhesive bonding surface 332. Thus, in the present embodiment, the peak value of the first acceleration peak in the primary collision can be increased compared to that in the first embodiment, and the amount of collision energy absorbed in the primary collision can be increased. Thus, the stroke before the secondary collision occurs is also decreased compared to that in the first embodiment, and the peak value of the second acceleration peak in the secondary collision can be decreased. Furthermore, the time period taken before the secondary collision finishes is also decreased, and the HIC value can be more effectively decreased compared to the first embodiment.

As is the case with the first embodiment, a variety of changes may be made to the inner panel 3 also in the present embodiment.

Figure 7:
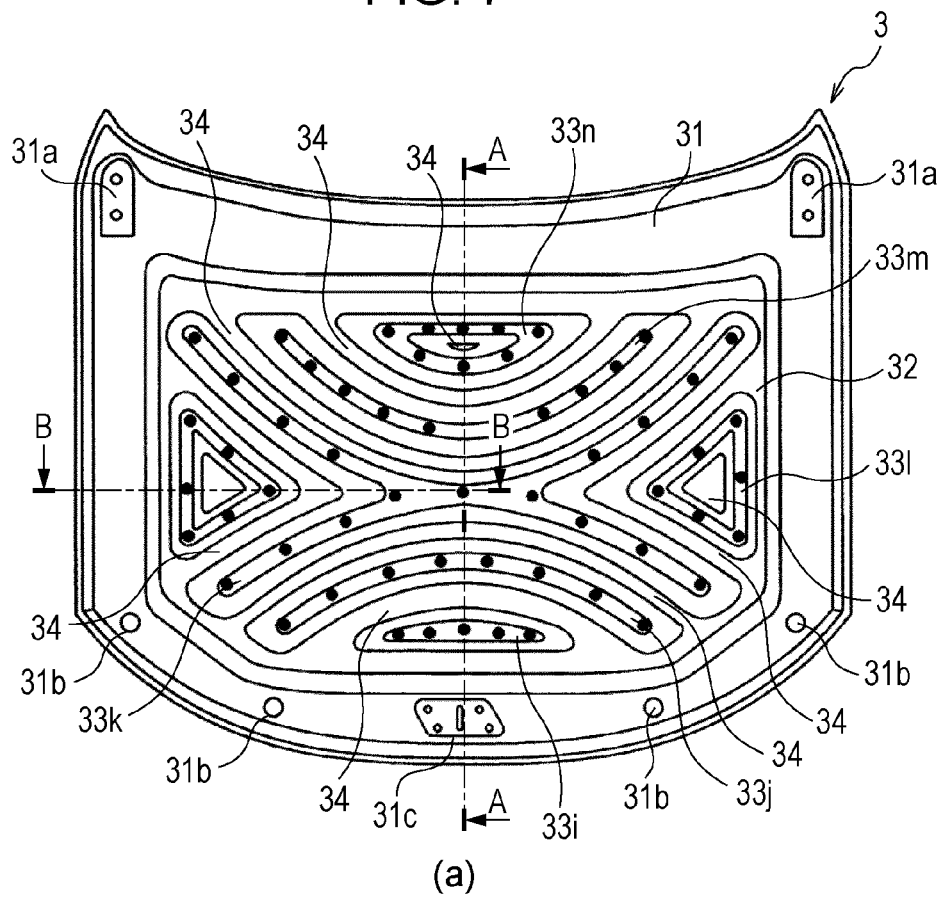
FIG. 7 View (a) is a plan view of a vehicle hood panel according to a third embodiment of the present invention, view (b) is a sectional view taken along line A-A in view (a) of FIG. 7, and view (c) is a sectional view taken along line B-B in view (a) of FIG. 7.
Figure 7:
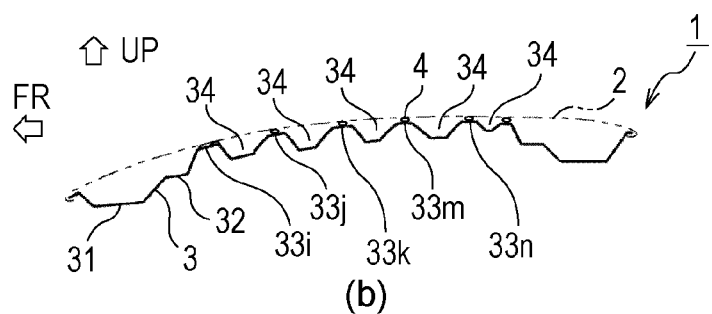
Figure 7:
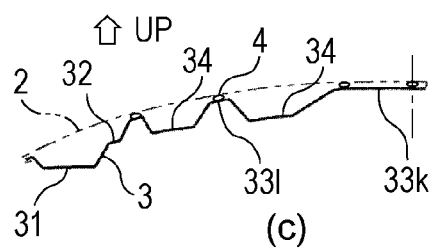

Next, the hood panel according to a third embodiment of the present invention is described. View (a) of FIG. 7 is a plan view of the vehicle hood panel according to the third embodiment of the present invention, view (b) of FIG. 7 is a sectional view taken along line A-A in view (a) of FIG. 7, and view (c) of FIG. 7 is a sectional view taken along line B-B in view (a) of FIG. 7. As illustrated in FIG. 7, in the present embodiment, as is the case with the first embodiment, the first adhesive bonding surfaces, which are to be joined by mastic to the outer panel 2, are provided at a plurality of positions. The difference between the present embodiment and the first embodiment is that these first adhesive bonding surfaces (portions 33i to 33n) provided at the plurality of positions are arranged in the vehicle front-rear direction. That is, in the present embodiment, as illustrated in FIG. 7, the first adhesive bonding surfaces include the following portions: the substantially annular portions 33i each provided near a corresponding the front end portions of the step portion 32 in the vehicle front-rear direction; the substantially dog-leg shaped portion 33j provided further toward the vehicle rear side than the annular portion 33i and curved so as to be convex toward the vehicle rear side in plan view so that both ends portions thereof extend toward the cushion member seating surfaces 31*b*; the portion 33*k* that is provided further toward the vehicle rear side than the portion 33*j* and has a part curved so as to be convex toward the vehicle rear side and a part curved so as to be convex toward vehicle front side, the centers of the curved parts being connected to each other; the substantially annular portions 331 each provided in a corresponding one of spaces between the parts of the portion 33*k* in the vehicle left-right direction; the curved portion 33*m* that is provided further toward the vehicle rear side than the portion 33*k* and convex toward the vehicle front side; and the substantially annular portion 33*n* provided between the curved parts of the portion 33*m*. In the portion 33*k*, each end portion of the part curved so as to be convex toward the vehicle rear side extends toward a corresponding one of the cushion member seating surfaces 31*b*, and each end portion of the part curved so as to be convex toward the vehicle front side extends toward a corresponding one of the hinge seating surfaces 31*a*. The reinforcement beads 34 formed between the portion 33*k* and the portion 33*m* also extend toward the hinge seating surfaces 31*a*. That is, in the present embodiment, the plurality of reinforcement beads 34 each extend in the vehicle left-right direction and are curved near the center of the hood panel 1 in the vehicle left-right direction.

Thus, also in the present embodiment, the upright walls in the bead side portions are formed of curved surfaces instead of flat surfaces. Curved parts of the reinforcement beads 34 near the center in the vehicle left-right direction have components extending in the vehicle front-rear direction, thereby functioning as reinforcing ribs. Thus, when the vehicle collides with the pedestrian, the reinforcement beads 34 are unlikely to be flattened. Furthermore, stress applied to the inner panel 3 can be transmitted in the vehicle left-right direction along the reinforcement beads 34 and also transmitted to the upright walls on the vehicle front side and the vehicle rear side.

In the present embodiment, for example, it is preferable that the radii of curvature of either or both of an upper end edge and a lower end edge of the reinforcement beads 34 in plan view be larger in the end portions than in the central portions in the vehicle left-right direction. With this structure, non-uniformity of the pedestrian protection performance in the vehicle left-right direction in the hood panel can be prevented.

Next, operation of a vehicle hood panel according to the present embodiment is described. When the pedestrian collides with the hood panel 1, shocks caused by the collision are initially transmitted to the outer panel 2, and part of the outer panel 2 near the collision position is deformed. This deformation stress is transmitted to the inner panel 3 near the collision position through the adhesive bonding surfaces 33. In the present embodiment, the reinforcement beads 34 extend in the vehicle left-right direction. Thus, when the pedestrian collides with the vehicle, stress applied to the inner panel 3 is transmitted in the vehicle left-right direction through the reinforcement beads 34. In the present embodiment, the reinforcement beads 34 arranged in the vehicle front-rear direction each extend generally in the vehicle left-right direction and are curved near the center in the vehicle left-right direction. The upright walls in the bead side portions are formed of curved surfaces. Thus, when deformation stress is applied from above, inclination of side walls is not easily changed. Accordingly, the inner panel 3 has a high rigidity, and a situation in which the reinforcement beads 34 are flattened is suppressed. Deformation stress applied to the reinforcement beads 34 can be transmitted in a direction in which the reinforcement beads 34 extend, for example, through the side walls and bottom surfaces of the reinforcement beads 34 and also transmitted in the vehicle front-rear direction through the side walls of the reinforcement beads 34. As described above, by transmitting the deformation stress, which is generated when the pedestrian collides with the vehicle, in the vehicle front-rear direction through the upright walls of the reinforcement beads 34 on the front and rear sides, the deformation stress is uniformly distributed in the vehicle left-right direction. Thus, the pedestrian protection performance in the hood panel is prevented from becoming non-uniform in the vehicle left-right direction.

When deformation of the hood panel 1 is advanced due to the primary collision, deformation acceleration of the inner panel 3, which is peaked at the time of the collision, is significantly decreased, and the amount of energy absorbed by the panel is also decreased. With the related-art hood panel, the peak value of the first acceleration peak is small and a decrease in deformation acceleration following the primary collision is significantly large. Thus, the stroke until the secondary collision occurs is increased and the peak value of the second acceleration peak in the secondary collision is significantly increased. Also, a time period taken before the secondary collision finishes is increased. This causes a problem in that the HIC value is increased. In the present embodiment, the adhesive bonding surfaces 33 include first adhesive bonding surfaces, which are provided at plurality of positions (portions 33*i* to 33*n*) so as to be arranged in the vehicle front-rear direction. The first adhesive bonding surfaces are joined by mastic to the outer panel 2. At least some of either or both of the adhesive bonding surfaces and the reinforcement beads are formed so as to extend toward the hinges or the cushion member in plan view. That is, in the adhesive bonding surfaces 33, both ends portions of the portion 33*j* extend toward the cushion member seating surfaces 31*b*, each end portion of the part of the portion 33*k* curved so as to be convex toward the vehicle rear side extends toward a corresponding one of the cushion member seating surfaces 31*b*, and each end portion of the part of the portion 33*k* curved so as to be convex toward the vehicle front side extends toward a corresponding one of the hinge seating surfaces 31*a*. The reinforcement beads 34 formed between the portion 33*k* and the portion 33*m* also extend toward the hinge seating surfaces 31*a*. These hinge seating surfaces 31*a* and the cushion member seating surfaces 31*b* are parts to which the hinges or the cushion rubber are to be secured when the hood panel 1 is attached to the vehicle and are parts that are very stable because they are subjected to small vibration or the like while the vehicle is running. Also in these parts, deformation, vibration, and the like of the panel due to an impact load are very small when the pedestrian collides with the vehicle. Thus, as is the case with the first embodiment, the relationship between the deformation stroke and collision acceleration and the relationship between time and collision acceleration appear more like a rectangular wave as indicated by the solid line in the correlation charts illustrated in FIGS. 3 and 4. That is, also in the present embodiment, large deformation acceleration following the first acceleration peak in the primary collision can be maintained, and accordingly, the amount of energy absorbed by the hood panel can be increased. Thus, the stroke before the secondary collision occurs is decreased, and the peak value of the second acceleration peak in the secondary collision can also be decreased. Furthermore, since collision energy can be sufficiently absorbed when the primary collision occurs, the time period taken before the secondary collision finishes is decreased, and the HIC value can be decreased. Thus, the pedestrian protection performance of the hood panel according to the present embodiment is also significantly high.

Furthermore, in the present embodiment, since the reinforcement beads 34 extend generally in the vehicle left-right direction, in addition to the above-described effect produced when the pedestrian collides with the vehicle, the hood panel 1 easily bent into a dog-leg shape in side view when the vehicle collides with the other vehicle in a frontal collision. Thus, also in this case, collision energy can be effectively absorbed, and entrance of the panel and the like into the vehicle can be effectively prevented.

As illustrated in FIG. 7, in the present embodiment, all the first adhesive bonding surfaces, which are to be joined by mastic to the outer panel 2, are curved. Alternatively; in the hood panel 1, for example, only the adhesive bonding surfaces provided further toward the vehicle front side or further toward the vehicle rear side than the center in the vehicle front-rear direction may be curved.

As is the case with the first and second embodiments, a variety of changes may be made to the inner panel 3 also in the present embodiment.

Figure 8:
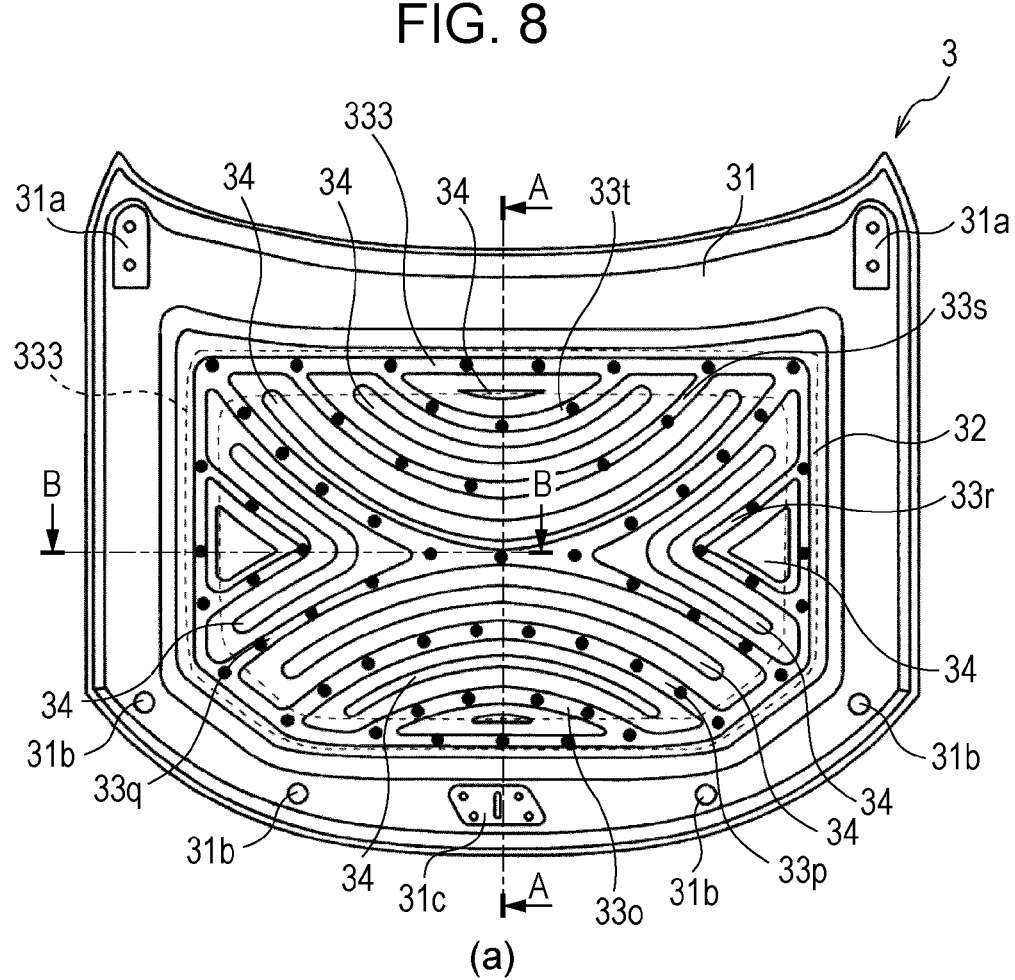
FIG. 8 View (a) is a plan view of a vehicle hood panel according to a fourth embodiment of the present invention, view (b) is a sectional view taken along line A-A in view (a) of FIG. 8, and view (c) is a sectional view taken along line B-B in view (a) of FIG. 8.
Figure 8:
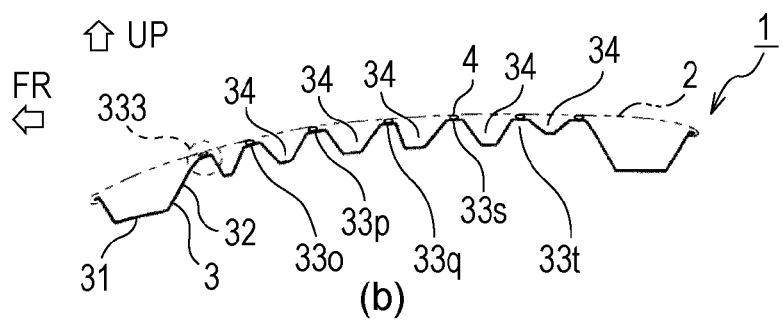
Figure 8:
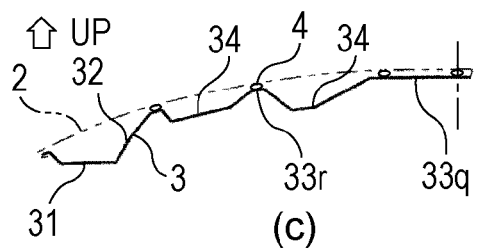

Next, the hood panel according to a fourth embodiment of the present invention is described. View (a) of FIG. 8 is a plan view of the vehicle hood panel according to the fourth embodiment of the present invention, view (b) of FIG. 8 is a sectional view taken along line A-A in view (a) of FIG. 8, and view (c) of FIG. 8 is a sectional view taken along line B-B in view (a) of FIG. 8. As illustrated in FIG. 8, in the present embodiment, the adhesive bonding surfaces 33 include a first adhesive bonding surfaces (portions 33o to 33t) provided at plurality of positions so as to be arranged in the vehicle front-rear direction in plan view. The end portions of the first adhesive bonding surfaces are connected to one another by a second adhesive bonding surface 333, which surrounds the first adhesive bonding surfaces. Other structures are similar to those of the third embodiment.

Also in the present embodiment, as is the case with the second embodiment, the end portions of the first adhesive bonding surfaces are connected to one another through the second adhesive bonding surface 333. Thus, as illustrated in FIG. 8, side walls of the second adhesive bonding surface 333 are formed at the end portions of the reinforcement beads 34 formed between the portions 33o to 33t of the first adhesive bonding surfaces. Accordingly; deformation stress transmitted along the reinforcement beads 34 in the primary collision is transmitted to the second adhesive bonding surface 333 through the side walls of the second adhesive bonding surface 333, and then transmitted in the vehicle front-rear direction along the second adhesive bonding surface 333. Thus, in the present embodiment, the peak value of the first acceleration peak in the primary collision can be increased compared to that in the third embodiment, and the amount of collision energy absorbed in the primary collision can be increased. Thus, the stroke before the secondary collision occurs is also decreased compared to that in the third embodiment, and the peak value of the second acceleration peak in the secondary collision can be decreased. Furthermore, the time period taken before the secondary collision finishes is also decreased, and the HIC value can be more effectively decreased compared to that in the third embodiment.

Figure 11:
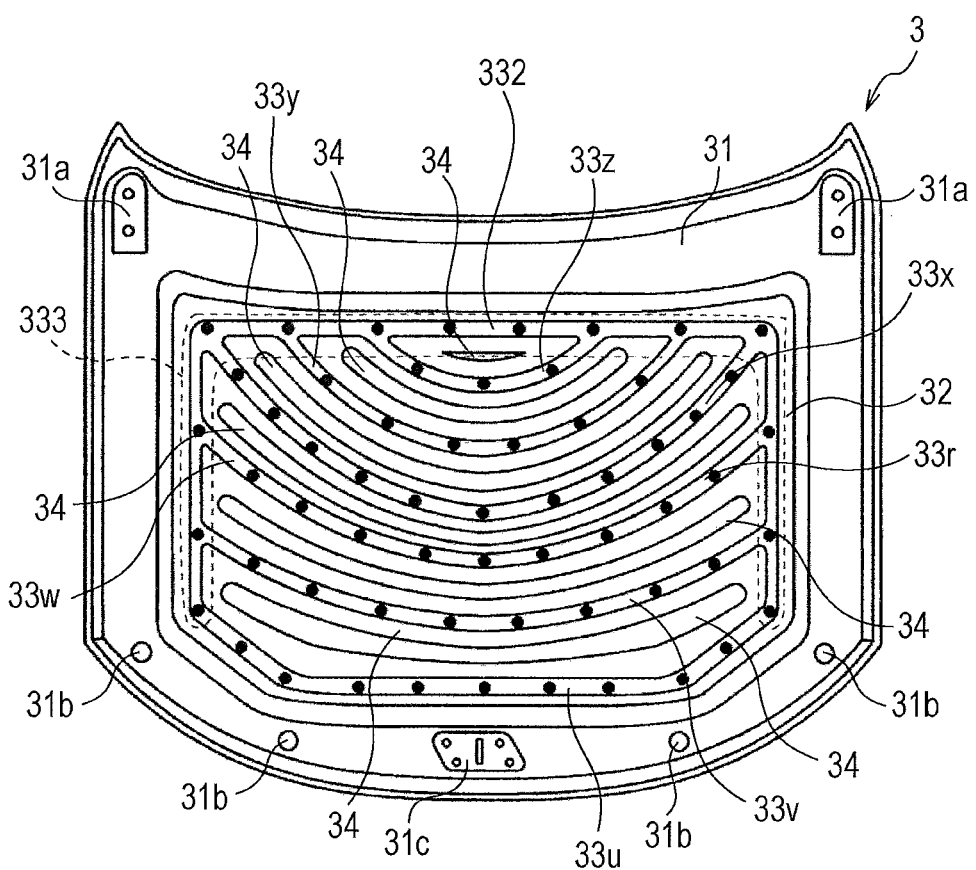
FIG. 11 is a plan view of a vehicle hood panel according to a seventh embodiment of the present invention.

As is the case with the first to third embodiments, a variety of changes may be made to the inner panel 3 also in the present embodiment. For example, as illustrated in FIG. 11, substantially dog-leg shaped first adhesive bonding surfaces (portions 33u to 33z) may be provided at a plurality of positions so as to be arranged in the vehicle front-rear direction and curved so as to be convex toward the vehicle front side in plan view, and end portions of the first adhesive bonding surfaces are connected to one another through the second adhesive bonding surface 332, which surrounds the first adhesive bonding surfaces.

Figure 9:
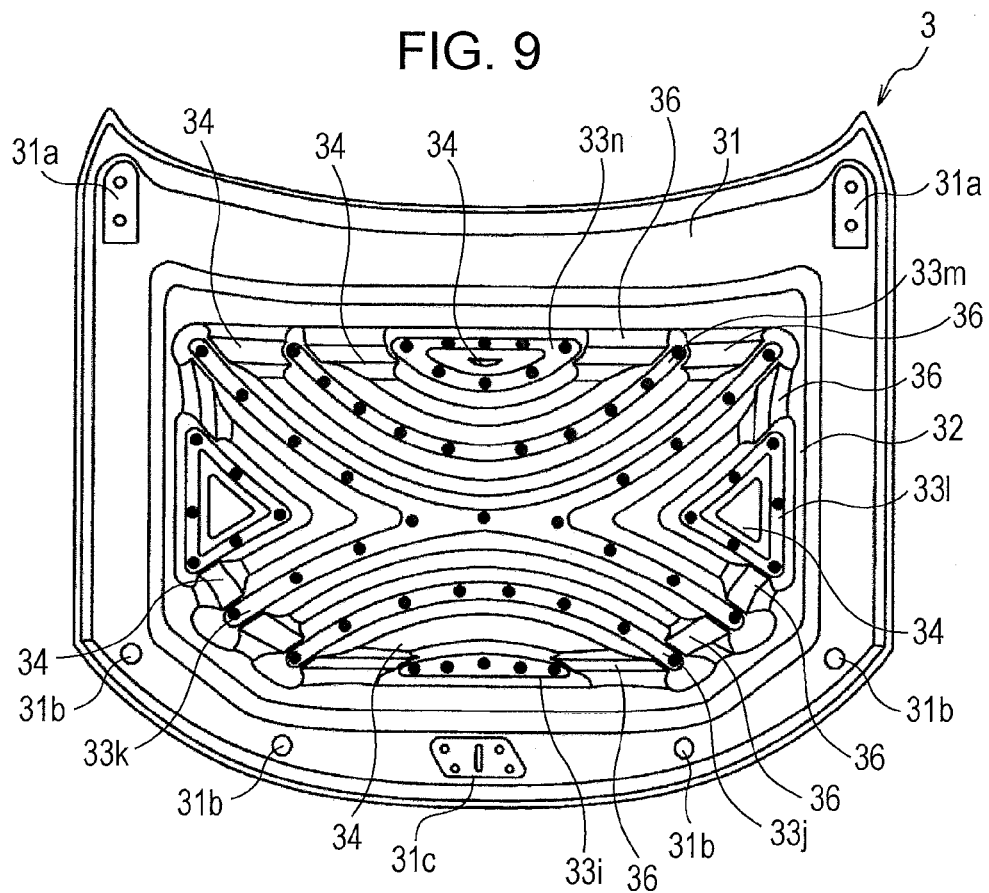
FIG. 9 is a plan view of a vehicle hood panel according to a fifth embodiment of the present invention.

Next, the vehicle hood panel according to a fifth embodiment of the present invention is described. FIG. 9 is a plan view of the vehicle hood panel according to the fifth embodiment of the present invention. In the present embodiment, in the inner panel 3 according to the first embodiment, intermediate reinforcement beads 36 are provided at the end portions of reinforcement beads 34 so as to rise from the bottom surfaces of the reinforcement beads 34 and to connect the both side surfaces of each of the reinforcement beads 34 as illustrated in FIG. 9. The height of the intermediate reinforcement beads 36 from the bottom surface of the reinforcement heads 34 is lower than the first adhesive bonding surfaces 33. Thus, the upper surfaces of the intermediate reinforcement beads 36 are not joined by mastic to the outer panel 2.

In the present embodiment, the plurality of reinforcement beads 34 are each provided between the first adhesive bonding surfaces 331 arranged in the vehicle left-right direction. In each reinforcement bead 34, both the side surfaces at each end portion are connected to each other through the intermediate reinforcement bead 36 that rises from the bottom surface of the reinforcement bead 34. That is, since side walls of the intermediate reinforcement beads 36 are provided at the end portions of the reinforcement beads 34, deformation stress, which is transmitted along the reinforcement beads 34 in the primary collision as is the case with the second embodiment, is transmitted to the intermediate reinforcement beads 36 through the side walls of the intermediate reinforcement heads 36, and further transmitted to the vehicle left-right direction along the intermediate reinforcement beads 36. In comparison with the second embodiment, in which the second adhesive bonding surface 332 is provided and joined by mastic to the outer panel 2, in the present embodiment, the height of the intermediate reinforcement beads 36 from the bottom surfaces of the reinforcement beads is lower than the second adhesive bonding surface 332 and the intermediate reinforcement beads 36 are not joined by mastic. Thus, compared to the second embodiment, rigidity of the hood panel is slightly decreased and the collision energy transmitting characteristic is also slightly decreased. Despite this, also in the present embodiment, the peak value of the first acceleration peak in the primary collision can be increased compared to that in the first embodiment, and the amount of collision energy absorbed in the primary collision can be increased, thereby the stroke before the secondary collision occurs is decreased, and the peak value of the second acceleration peak in the secondary collision can also be decreased. Furthermore, the time period taken before the secondary collision finishes can be decreased, and the HIC value can be effectively decreased.

Figure 10:
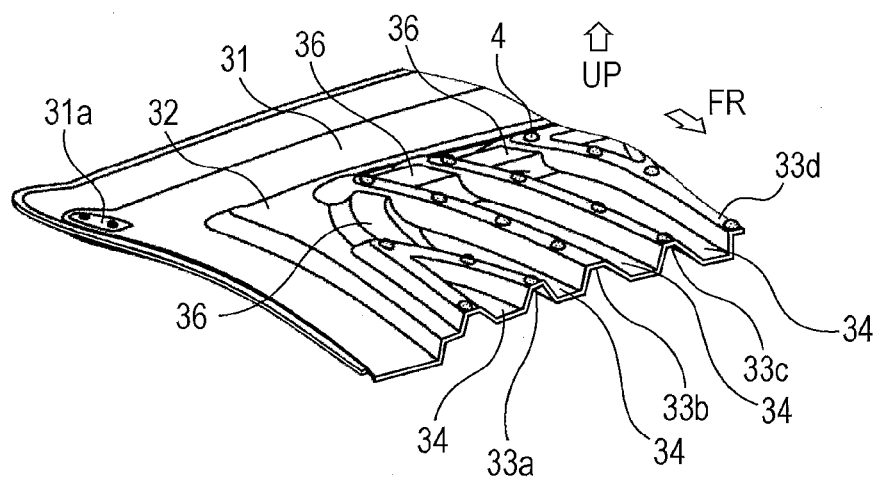
FIG. 10 is a perspective view of part of an inner panel of a vehicle hood panel according to a sixth embodiment of the present invention.

Next, the vehicle hood panel according to a sixth embodiment of the present invention is described. FIG. 10 is a perspective view of part of the inner panel of the vehicle hood panel according to the sixth embodiment of the present invention. In the present embodiment, in the inner panel 3 according to the second embodiment, as is the case with the fifth embodiment, the intermediate reinforcement beads 36 are provided at the end portions of reinforcement beads 34 so as to rise from the bottom surfaces of the reinforcement beads 34 and to connect the both side surfaces of each of the reinforcement beads 34 through the intermediate reinforcement head 36 as illustrated in FIG. 10. That is, the height of the intermediate reinforcement beads 36 from the bottom surface of the reinforcement beads 34 is lower than the first adhesive bonding surfaces 33, and the upper surfaces of the intermediate reinforcement beads 36 are not joined by mastic to the outer panel 2.

In the present embodiment, the plurality of reinforcement beads 34 are each provided between the first adhesive bonding surfaces 331 arranged in the vehicle front-rear direction. In each reinforcement bead 34, both the side surfaces at each end portion are connected to each other through the intermediate reinforcement bead 36 that rises from the bottom surface of the reinforcement bead 34. That is, since side walls of the intermediate reinforcement beads 36 are provided at the end portions of the reinforcement, beads 34, deformation stress transmitted along the reinforcement beads 34 in the primary collision is transmitted to the intermediate reinforcement beads 36 through the side walls of the intermediate reinforcement beads 36, and further transmitted to the vehicle front-rear direction along the intermediate reinforcement beads 36. In comparison with the fourth embodiment, in which the second adhesive bonding surface 332 is provided and joined by mastic to the inner panel 2, in the present embodiment, the height of the intermediate reinforcement beads 36 from the bottom surfaces of the reinforcement beads is lower than the second adhesive bonding surface 332 and the intermediate reinforcement beads 36 are not joined by mastic. Thus, compared to the forth embodiment, rigidity of the hood panel is slightly decreased and the collision energy transmitting characteristic is also slightly decreased. Despite this, also in the present embodiment, the peak value of the first acceleration peak in the primary collision can be increased compared to that in the third embodiment, and the amount of collision energy absorbed in the primary collision can be increased, thereby the stroke before the secondary collision occurs is decreased, and the peak value of the second acceleration peak in the secondary collision can also be decreased. Furthermore, the time period taken before the secondary collision finishes can be decreased, and the HIC value can be effectively decreased.

Next, the vehicle hood panel according to a seventh embodiment of the present invention is described. FIG. 11 is a plan view of the vehicle hood panel according to the seventh embodiment of the present invention. In the present embodiment, the first adhesive bonding surfaces 331 and the reinforcement beads 34 formed between the first adhesive bonding surfaces 331 are curved at the center of the first adhesive bonding surfaces 331 and the reinforcement beads 34 so as to be convex toward the vehicle front side, and the end portions of the first adhesive bonding surfaces 331 and the reinforcement beads 34 extend toward the hinge seating surfaces 31a on the vehicle rear side. Also in the case where each of the reinforcement beads 34 is curved so as to be convex toward the vehicle front side as described above, the end portions of the reinforcement beads 34 extend toward portions to which the hinges are to be secured. Thus, vibration and the like are suppressed while the vehicle is running. Furthermore, in the portions to which the hinges are to be secured, deformation, vibration, and the like of the panel due to an impact load are very small when the pedestrian collides with the vehicle. Thus, the effects similar to those of the first to sixth embodiments can be obtained.

In the present invention described above, the advantageous effects of the present invention can be significantly obtained by selecting the arrangements of the reinforcement beads and first adhesive bonding surfaces in accordance with, for example, the length of the hood panel in the vehicle front-rear direction. That is, in the case where the length of the hood panel in the vehicle front-rear direction is long, it is preferable that the reinforcement beads and the first adhesive bonding surfaces be arranged in the vehicle left-right direction, and in the case where the length of the hood panel in the vehicle front-rear direction is short, it is preferable that the reinforcement beads and the first adhesive bonding surfaces be arranged in the vehicle front-rear direction.

The invention claimed is:

1. A vehicle hood panel that includes an outer panel and an inner panel joined to each other,
   wherein the inner panel includes
   an outer peripheral portion provided along an outer peripheral edge of the inner panel, a hinge seating surface and a cushion member seating surface being provided on the outer peripheral portion to attach a hinge and a cushion member, the hinge being used to connect the hood panel to a vehicle main body and the cushion member being used to prevent the hood panel from interfering with the vehicle main body,
   first adhesive bonding surfaces provided in a region surrounded by the outer peripheral portion, the first adhesive bonding surfaces being joined by mastic to the outer panel, and
   a plurality of reinforcement beads each has a recessed portion in sectional view, said recessed portion of the reinforcement beads being positioned between the first adhesive bonding surfaces,
   wherein at least two of the first adhesive bonding surfaces and at least one recessed portion between the adjacent adhesive bonding surfaces are curved in a plan view with respect to a front-rear direction of the vehicle so as to extend toward the hinge.

2. The vehicle hood panel according to claim 1, wherein the first adhesive bonding surfaces are provided at a plurality of positions so as to be arranged in a vehicle left-right direction.

3. The vehicle hood panel according to claim 1, wherein the first adhesive bonding surfaces are provided at a plurality of positions so as to be arranged in a vehicle front-rear direction.

4. The vehicle hood panel according to claim 1, wherein at least one of the first adhesive bonding surfaces is in a boomerang shape in a plan view such that a straight line along the vehicle front-rear direction intersects at two points along the at least one of the first adhesive bonding surfaces.

5. The vehicle hood panel according to claim 1, wherein at least one of the first adhesive bonding surfaces is in a boomerang shape in a plan view such that a straight line along the vehicle left-right direction intersects at two points along the at least one of the first adhesive bonding surfaces.

6. The vehicle hood panel according to claim 2 or claim 3, wherein the inner panel further includes a second adhesive bonding surface that connects end portions of the first adhesive bonding surfaces to one another.

7. The vehicle hood panel according to claim 6, wherein bottom surfaces of the reinforcement beads are provided at positions 5 to 30 mm deep from the second adhesive bonding surface.

8. The vehicle hood panel according to any one of claims 1 to 3,
   wherein the inner panel is formed of an aluminum plate or an aluminum alloy plate having a thickness of 0.5 to 1.5 mm, or a steel plate having a thickness of 0.4 to 1.0 mm.

9. The vehicle hood panel according to any one of claims 1 to 3,
   wherein bottom surfaces of the reinforcement beads are provided at positions 5 to 30 mm deep from the first adhesive bonding surfaces.

10. A vehicle hood panel that includes an outer panel and an inner panel joined to each other,
   wherein the inner panel includes
   an outer peripheral portion provided along an outer peripheral edge of the inner panel, a hinge seating surface and a cushion member seating surface being provided on the outer peripheral portion to attach a hinge and a cushion member, the hinge being used to connect the hood panel to a vehicle main body and the cushion member being used to prevent the hood panel from interfering with the vehicle main body,
   first adhesive bonding surfaces provided in a region surrounded by the outer peripheral portion, the first adhesive bonding surfaces being joined by mastic to the outer panel, and
   a plurality of reinforcement beads each has a recessed portion in sectional view, said recessed portion of the reinforcement beads being positioned between the first adhesive bonding surfaces,
   wherein at least some of both of the first adhesive bonding surfaces and the reinforcement beads are curved in a plan view with respect to a front-rear direction of the vehicle so as to extend toward the hinge
   wherein the first adhesive bonding surfaces are provided at a plurality of positions so as to be arranged in a vehicle left-right direction; and
   the inner panel further includes intermediate reinforcement beads, each of the reinforcement beads being provided with the intermediate reinforcement bead that projects upwardly from a bottom surface of recessed portion of the reinforcement bead at an end portion of the reinforcement bead so as to connect both side surfaces of the reinforcement bead to each other, an upper surface of the intermediate reinforcement bead being lower than the first adhesive bonding surfaces.

11. A vehicle hood panel that includes an outer panel and an inner panel joined to each other,
   wherein the inner panel includes
   an outer peripheral portion provided along an outer peripheral edge of the inner panel, a hinge seating surface and a cushion member seating surface being provided on the outer peripheral portion to attach a hinge and a cushion member, the hinge being used to connect the hood panel to a vehicle main body and the cushion member being used to prevent the hood panel from interfering with the vehicle main body,
   first adhesive bonding surfaces provided in a region surrounded by the outer peripheral portion, the first adhesive bonding surfaces being joined by mastic to the outer panel, and
   a plurality of reinforcement beads each has a recessed portion in sectional view, said recessed portion of the reinforcement beads being positioned between the first adhesive bonding surfaces,
   wherein at least some of both of the first adhesive bonding surfaces and the reinforcement beads are curved in a plan view with respect to a front-rear direction of the vehicle so as to extend toward the hinge
   wherein the inner panel further includes an outer peripheral step that is provided along an inner edge of the outer peripheral portion surrounding the plurality of reinforcement beads and that extends upward from the outer peripheral portion so as to have a step shape.

\* \* \* \* \*